R. T. McGEE.
CHARGING APPARATUS FOR GLASS MOLDS.
APPLICATION FILED JULY 26, 1918.

1,315,562.

Patented Sept. 9, 1919.
3 SHEETS—SHEET 1.

INVENTOR
Richard T. McGee.
BY
ATTORNEY

R. T. McGEE.
CHARGING APPARATUS FOR GLASS MOLDS.
APPLICATION FILED JULY 26, 1918.

1,315,562.

Patented Sept. 9, 1919.
3 SHEETS—SHEET 2.

INVENTOR
Richard T. McGee.
BY
H. E. Dunlap
ATTORNEY

R. T. McGEE.
CHARGING APPARATUS FOR GLASS MOLDS.
APPLICATION FILED JULY 26, 1918.

1,315,562.

Patented Sept. 9, 1919.

INVENTOR
Richard T. McGee.
BY
H. E. Dunlap.
ATTORNEY

UNITED STATES PATENT OFFICE.

RICHARD T. McGEE, OF WHEELING, WEST VIRGINIA.

CHARGING APPARATUS FOR GLASS-MOLDS.

1,315,562.

Specification of Letters Patent.   Patented Sept. 9, 1919.

Application filed July 26, 1918. Serial No. 246,824.

*To all whom it may concern:*

Be it known that I, RICHARD T. McGEE, a citizen of the United States of America, and resident of Wheeling, county of Ohio, and State of West Virginia, have invented certain new and useful Improvements in Charging Apparatus for Glass-Molds, of which the following is a specification.

This invention relates broadly to glass working apparatus, and more specifically to a charging apparatus for glass molds.

The primary object of the invention is to provide improved means for delivering glass from a melting pot or tank to a mold in which it is shaped.

A further object is to provide an apparatus whereby glass from a tank may be delivered to a blow or press mold without either exposing the same to the air or to the chilling which results from the use of a relatively cold ladle or other gathering instrument of the character commonly employed.

A still further object of the invention is to provide means whereby charges of molten glass may be delivered to a shaping mold in any desired condition of plasticity.

With these and other objects in view, the invention resides in the features of construction, arrangement of parts and combinations of elements which will hereinafter be fully described, reference being had to the accompanying drawings in which—

Referring to said drawings, in which like designating characters distinguish like parts throughout the several views—

Figure 1:
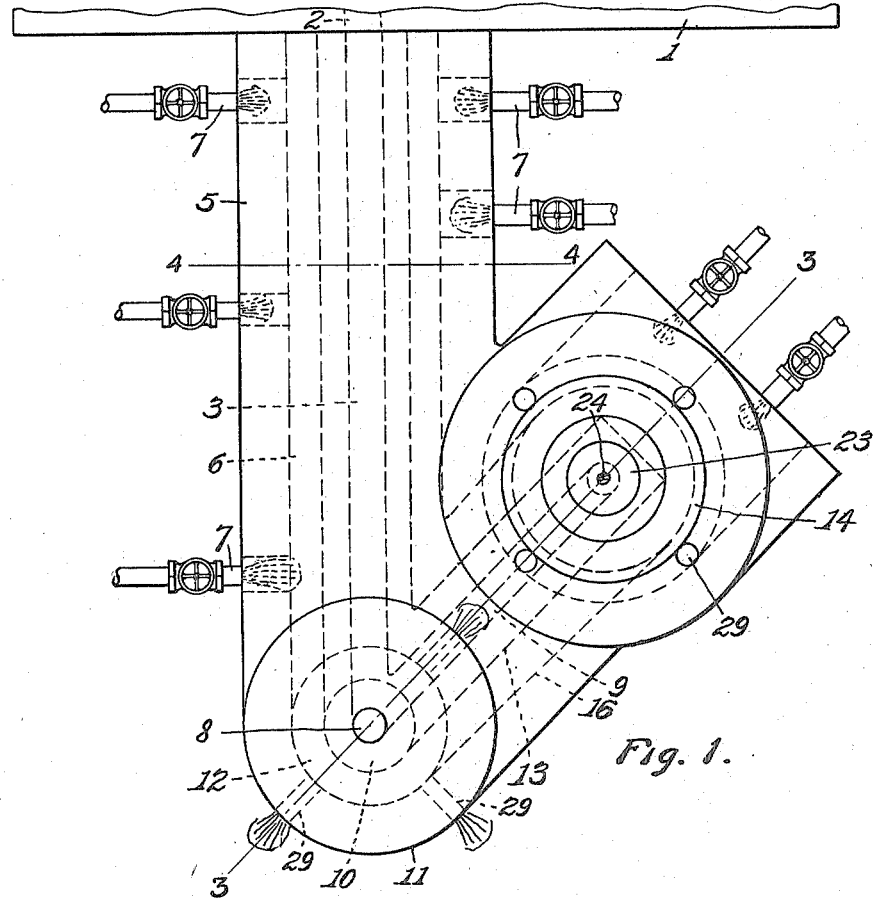
Figure 1 is a top plan view of the invention.
Figure 4:
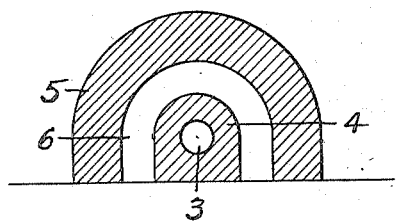
Fig. 4 is a transverse section on line 4—4, Fig. 1.
Figure 2:
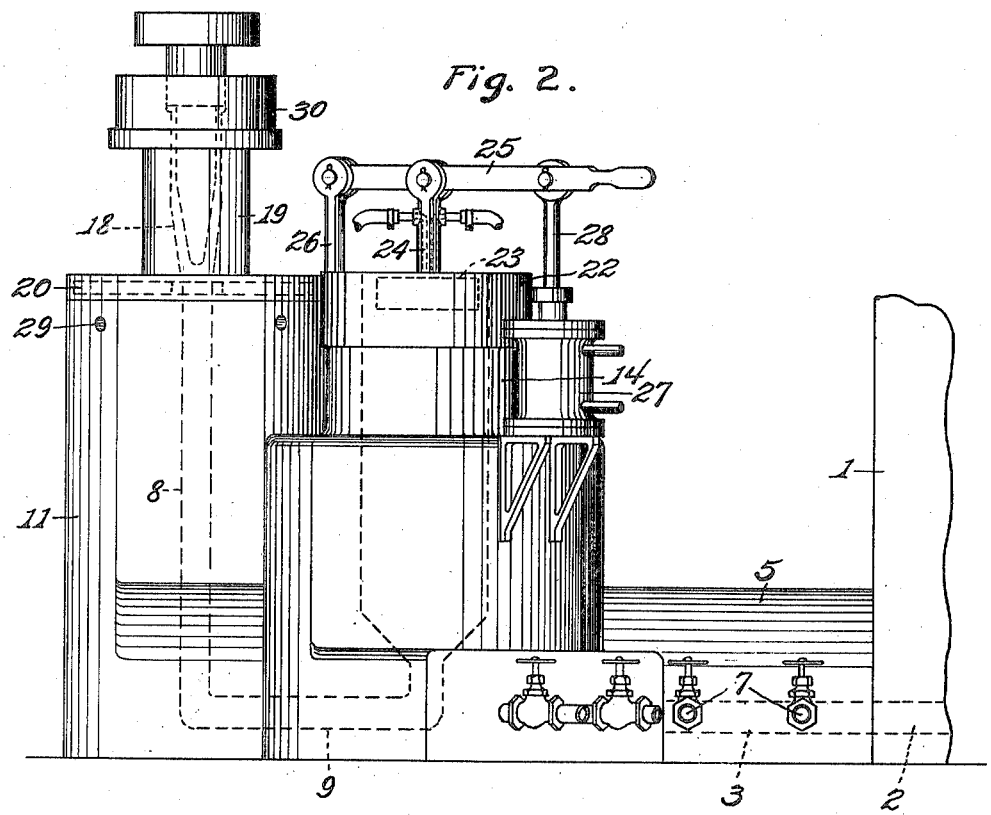
Fig. 2 is a side elevation of the same.

1 indicates generally a glass tank having a passage 2 located at a suitable point in a wall thereof. Communicating with said passage 2 is one end of a passage or duct 3 provided in a conduit 4 of suitable refractory material which preferably has a horizontal disposition, as shown. Said conduit 4 is inclosed by a wall 5 which is located at a spaced distance therefrom to provide an intermediate fire space 6 into which blasts of burning gas are directed from burners or nozzles 7 located at suitable intervals for maintaining the proper degree of fluidity of the glass which flows by gravity from the tank through said conduit. Said duct 3 communicates at its outer end with each of a well 8 and duct 9, the latter leading horizontally in a direction lateral with respect to said duct 3. Said well leads vertically upward through a circular upright conduit 10 which is inclosed by a wall 11 located at a spaced distance therefrom to provide an intermediate annular fire space 12 which is in open communication with the fire space 6 hereinbefore mentioned.

The duct 9 leads through a conduit 13 similar to the conduit 4 and communicates with the lower end of a vertically disposed, cylindrical receptacle or tank 14 of relatively large diameter which is open at its upper end, as shown. The conduit 13 is at least partially surrounded by a fire space 16 which communicates at one end with the fire spaces 6 and 12 and at its opposite end with a fire space 15 encircling the lower portion of the walls 17 by which the receptacle 14 is defined.

All of the various conduits and the walls enclosing the various fire spaces are either composed of a refractory material or have refractory linings.

Glass from the melting tank 1 flows by gravity through the passage 2 thereof and the duct 3 of conduit 4 and then, seeking the level of the glass in said tank, rises in a column in the well 8 of conduit 10 which is open at its upper end and which is designed to discharge into a cavity 18 provided in a blank forming mold, as 19, seated upon the upper end of the pedestal constituted by the walls 11. Said upper end is of flat table-like form and may be surmounted by a suitable water jacket, as 20, having a flat upper face for receiving the mold 19 thereon and having a passage 21 therethrough in register with said well 8.

Glass likewise rises in the receptacle 14 at the same time that it rises in the well 8, such glass entering said receptacle through the duct 9.

By adjustment of the various gas burners or nozzles 7 which are suitably arranged to direct gases into the fire spaces in engagement with the various conduits and with the lower end of the receptacle defining walls 17, any desired degree of fluidity of the glass within said conduits may be maintained. The fire space 15 encircles only the lower part of the receptacle 14 so that the upper part of the latter remains comparatively cool, due to which, and also to the fact that said receptacle is open to the atmosphere at its upper end, the glass adjacent to said open end, or mouth, of said receptacle is chilled to a marked extent. This chilling may be increased by providing a water jacket 22 at or adjacent to the mouth of the receptacle, it being designed that the glass at said mouth shall be cooled to and be maintained in a semi-solid elastic state of tough rubber-like consistency. Seated upon or in the relatively cool glass at the mouth of said receptacle is a piston or plunger 23 which is adapted to be depressed to displace glass in said receptacle and in the duct 9 and well 8 whereby the column of glass in the latter is actuated to rise for filling the mold 19 superposed upon the pedestal top.

The cooled glass at the top of the receptacle adheres more or less tenaciously to the walls of the receptacle, and, consequently, were the plunger made of a size to fit the receptacle walls snugly, a relatively great resistance would be offered to glass-displacing movement thereof. The plunger is therefore made of a diameter materially less than that of the receptacle, as shown. Due to the tough, elastic character of the glass upon which the plunger rests, the glass does not rise past the sides of the plunger when the latter is depressed, but is stretched between the lower peripheral edge of the plunger and the receptacle walls to which it adheres. In other words, the cooled glass constitutes an elastic cushion-like packing which is depressed by the plunger to the extent required to displace a mold-filling quantity of workable glass. As is obvious, due to the relatively large diameter of the receptacle 14, a slight downward movement of the plunger suffices to displace the small quantity of glass required to fill a mold of average capacity.

When the mold has been filled in the manner described, it is shifted laterally. When so shifted, the mold coöperates with the pedestal top to shear the charge from the column. Obviously, the mold may be carried to and from charging position by a rotary press-table of any common or preferred type or it may be independent of such a table.

The plunger may be supported and actuated in any appropriate manner. As herein shown for illustrative purposes, said plunger has a vertical stem 24 pivotally attached to a lever 25 at a point intermediate the ends of the latter. Said lever, which has one end pivotally mounted upon a stationary post or standard 26, may be raised and lowered by hand or by suitable mechanical power, as by a suitably located power cylinder 27 the piston rod 28 of which has pivotal connection with said lever.

The gas burners 7 may be so located and adjusted that the glass in the conduits may be maintained at the desired consistency and that the consistency may differ at different points in said conduits. For instance, it may be desirable to increase the fluidity of the glass adjacent to the outer end of the duct 3 and at the lower end of the well 8 over that maintained in other parts of said duct, so that the glass will more readily rise in said well upon actuation of the plunger. Further, it is desirable that the glass be cooled to a readily workable plastic condition when ejected into the mold. Hence, the fire space 6 terminates at a suitable distance below the top of the pedestal, and a water cooled top 20 is provided on the latter. Suitably located vents 29 are provided through which the products of combustion are discharged from the various fire spaces.

The plunger 23 may be made hollow and have means associated therewith, as shown, for passing water therethrough to provide for artificial cooling thereof to the extent required.

Figure 6:
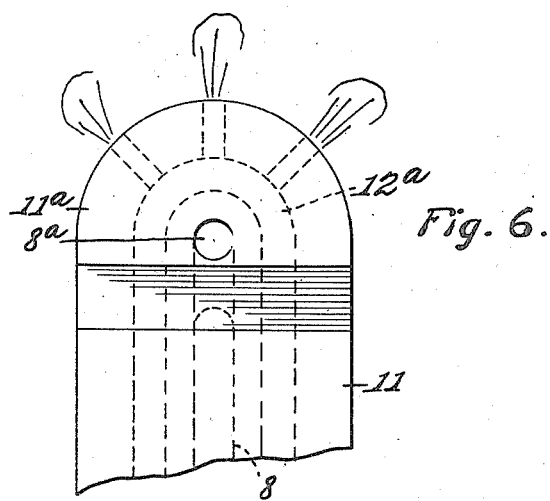
Fig. 6 is a front elevation of the delivery end of the structure shown in Fig. 5.
Figure 3:
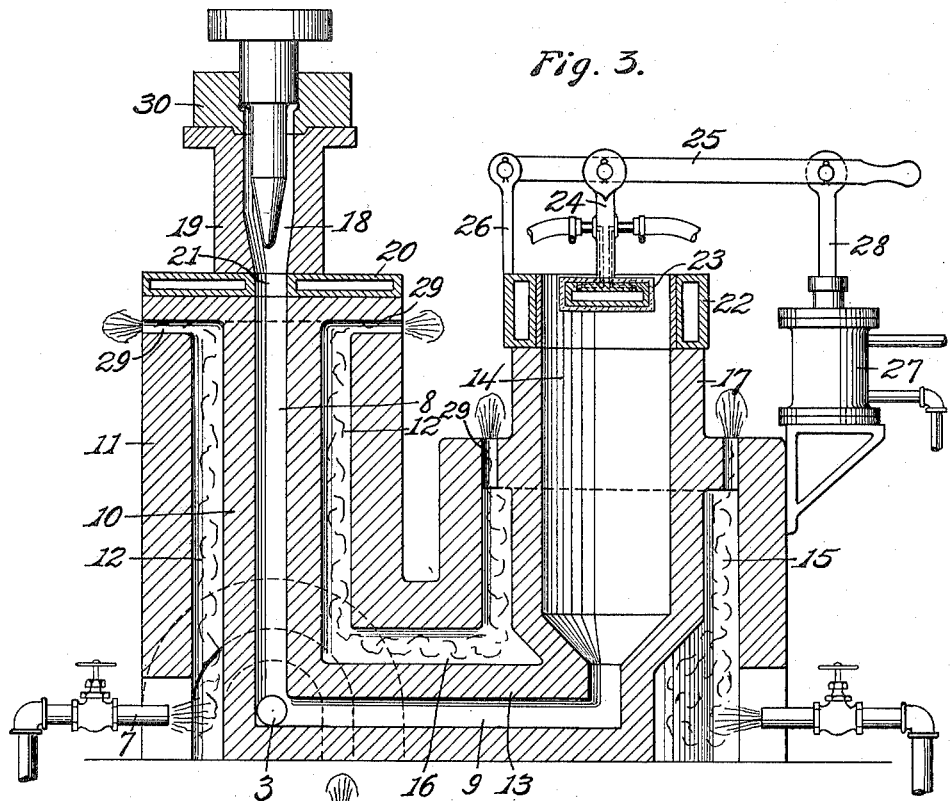
Fig. 3 is a vertical section on line 3—3, Fig. 1.
Figure 5:
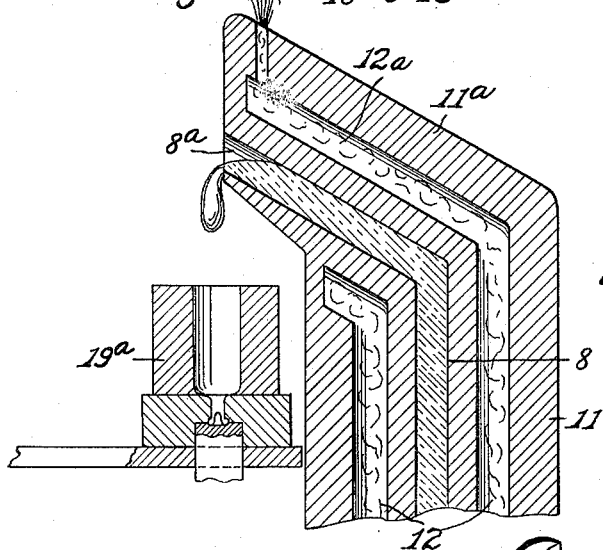
Fig. 5 is a detail section of a modified form of the invention; and—

The foregoing description applies specifically to a form of apparatus designed for use in the manufacture of glassware in which the blank mold remains in upright position following the charging operation— that is, the blank mold is charged with the neck-mold 30 disposed in superposed relation thereto. When, however, molds are to be charged in reversed positions, as is sometimes necessary or desirable, it becomes necessary to introduce the charge from the top instead of through the bottom, in which case I employ the modified form of apparatus shown in Figs. 5 and 6. In such modified form, an angularly disposed top 11ª is provided on the pedestal 11, with angularly disposed extensions of the well 8 and fire space 12 extended through said top, as shown respectively at 8ª and 12ª in Fig. 5. Said well extension 8ª opens to the atmosphere at a point located in overhanging relation to the charging position of the blank mold 19ª so that a charge of glass will drop from the open mouth directly into said mold through the open upper end of the latter. As is obvious, means for shearing off the quota of glass to be deposited in the mold 19ª may be provided at the mouth of the well extension 8ª, but since such means constitutes no part of the present invention I have not deemed it necessary to illustrate the same.

What is claimed is:—

1. Glass delivery apparatus comprising, in combination with a tank, a duct for molten glass leading from said tank, a well in communication with said duct, a receptacle for glass having communication at its lower end with said duct and adapted to have glass rise therein, temperature-reducing means whereby the glass at the upper end of said receptacle is cooled to a condition of elastic toughness, and a plunger mounted to be depressed on the surface of said cooled glass for producing the discharge of fluid glass from the well by displacement.

2. Glass delivery apparatus comprising, in combination with a melting tank, a receptacle for molten glass located adjacent to said tank, a conduit for conducting glass from said tank to said receptacle, a well in communication with said receptacle, controllable means associated with said receptacle and with said well for maintaining the glass at different temperatures in different parts, and means associated with said receptacle for producing glass displacement whereby glass is caused to be ejected from the mouth of said well.

3. Glass delivery apparatus comprising, in combination with a melting tank, a receptacle for molten glass located adjacent to said tank, a conduit for conducting glass from said tank to said receptacle, a well in communication with said receptacle, means whereby the surface glass in said receptacle is cooled to a condition of relatively high viscosity, and means adapted to act upon said surface glass for producing glass displacement whereby glass is caused to be ejected from the mouth of said well.

4. Glass delivery apparatus comprising, in combination with a melting tank, a receptacle for molten glass located adjacent to said tank, a conduit for conducting glass from said tank to said receptacle, a well in communication with said receptacle, means whereby the surface glass in said receptacle is cooled to a relatively high viscous state in which it constitutes an elastic diaphragm, and a plunger disposed to act upon said diaphragm to produce glass displacement whereby a quantity of glass is caused to be ejected from said well, said plunger being of materially less diameter than the receptacle space in which it operates.

5. Glass delivery apparatus comprising, in combination with a melting tank, a receptacle for molten glass, means permitting glass to flow from said tank to said receptacle through the bottom of the latter, said receptacle being located in such relation to said tank that the level of glass in said tank is normally maintained near the top of said receptacle, cooling means whereby the temperature of the surface glass in said receptacle is reduced for producing in said surface glass a condition of relatively high viscosity, a passage in open communication with said receptacle and leading to a delivery point above the level of the glass in said tank, and means adapted for acting upon said surface glass to produce glass displacement whereby glass is caused to be delivered from said passage at said delivery point.

6. Glass delivery apparatus comprising, in combination with a melting tank, a receptacle for molten glass, means permitting glass to flow from said tank to said receptacle, said receptacle being located in such relation to said tank that the level of glass in said tank is normally maintained near the top of said receptacle, cooling means whereby the temperature of the surface glass in said receptacle is reduced for producing in said surface glass a condition of relatively high viscosity, a passage in open communication with said receptacle and leading to a delivery point above the level of the glass in said tank, and means seated upon and adapted to be actuated to depress said surface glass for producing displacement to the extent that glass is forced from said passage at said delivery point.

7. Glass delivery apparatus comprising, in combination with a melting tank, a receptacle for molten glass, means permitting glass to flow from said tank to said receptacle through the bottom of the latter, said receptacle being located in such relation to said tank that the level of glass in said tank is normally maintained near the top of said receptacle, cooling means whereby the temperature of the surface glass in said receptacle is reduced for producing in said surface glass a condition of relatively high viscosity, a passage in open communication with said receptacle and leading to a delivery point above the level of the glass in said tank, and a plunger disposed over said surface glass and adapted to be actuated to depress the latter for producing glass displacement whereby glass is forced from said passage at said delivery point.

8. Glass delivery apparatus comprising, in combination with a melting tank, a receptacle for molten glass, means permitting glass to flow from said tank to said receptacle, said receptacle being located in such relation to said tank that the level of glass in said tank is normally maintained near the top of said receptacle, means whereby the surface glass in said receptacle is cooled to a state of semi-solidity to form an elastic diaphragm, a well having communication with said receptacle, and means adapted to act upon said diaphragm for depressing the latter to create glass displacement in which glass is ejected from the mouth of said well.

9. Glass delivery apparatus comprising, in combination with a melting tank, a receptacle for molten glass, means permitting glass to flow from said tank to said receptacle through the bottom of the latter, said receptacle being located in such relation to said tank that the level of glass in said tank is normally maintained near the top of said receptacle, means whereby the surface glass in said receptacle is cooled to a state of semi-solidity to form an elastic diaphragm, a well having communication with said receptacle, and a plunger disposed in seating relation to said diaphragm and adapted for actuation to depress the latter for creating glass displacement in which glass is ejected from the mouth of said well, said plunger having a materially smaller diameter than that portion of said receptacle in which it operates.

10. Glass delivery apparatus comprising, in combination with a melting tank, a receptacle for molten glass, means permitting glass to flow from said tank to said receptacle through the bottom of the latter, said receptacle being located in such relation to said tank that the level of glass in said tank is normally maintained near the top of said receptacle, means whereby the surface glass in said receptacle is cooled to a state of semi-solidity to form an elastic diaphragm, a well having communication with said receptacle, and a plunger disposed in seating relation to said diaphragm and adapted for actuation to depress the latter for creating glass displacement in which glass is ejected from the mouth of said well, and means for controlling the consistency of the glass between the tank and the mouth of said well.

11. Glass delivery apparatus comprising, in combination with a melting tank, a receptacle for molten glass, means permitting glass to flow from said tank to said receptacle through the bottom of the latter, said receptacle being located in such relation to said tank that the level of glass in said tank is normally maintained near the top of said receptacle, means whereby the surface glass in said receptacle is cooled to a state of semi-solidity to form an elastic diaphragm, a well having communication with said receptacle, and a plunger disposed in seating relation to said diaphragm and adapted for actuation to depress the latter for creating glass displacement in which glass is ejected from the mouth of said well, means for maintaining the fluidity of the glass during its flow from the tank to said receptacle and to said well, and means for cooling the glass to working consistency at the mouth of said well.

12. The combination with a glass-melting tank and a ware-shaping mold, the latter having a glass-introducing opening in its bottom, of apparatus for effecting the transfer of glass from said tank to said mold, said apparatus comprising a pedestal having its top located above the level of the glass in said tank and having a passage for glass leading upward therethrough, said pedestal being adapted for receiving said mold thereon with the bottom opening of the latter in register with the mouth of said passage, a conduit leading from said tank to said passage and adapted to permit glass to flow therethrough and to rise in said passage to the level of the glass in said tank, means for producing upwardly-acting glass displacement in said passage whereby a charge of glass is deposited within said mold, and means for controlling the consistency of the glass in said passage.

13. The combination with a glass-melting tank and a ware-shaping mold, the latter having a glass-introducing opening in its bottom, of apparatus for effecting the transfer of glass from said tank to said mold, said apparatus comprising a pedestal having its top located above the level of the glass in said tank and having a passage for glass leading upward therethrough, said pedestal being adapted for receiving said mold thereon with the bottom opening of the latter in register with the mouth of said passage, a receptacle located laterally with respect to said pedestal, a conduit leading from said tank to said receptacle and having communication with said passage, said conduit affording means to flow molten glass to said receptacle and to said passage, in each of which such glass rises to the level of the glass in said tank, means to cool the surface of the glass in said receptacle to a condition of high viscosity in which it constitutes an elastic diaphragm overlying glass of relatively low viscosity, and a plunger cushioned on said diaphragm and adapted to be depressed for displacing glass in said receptacle and in said passage whereby the column of glass in the latter is elevated to a point at which a charge thereof is received within said mold.

14. The combination with a glass-melting tank and a ware-shaping mold, the latter having a glass-introducing opening in its bottom, of apparatus for effecting the transfer of glass from said tank to said mold, said apparatus comprising a pedestal having its top located above the level of the glass in said tank and having a passage for glass leading upward therethrough, said pedestal being adapted for receiving said mold thereon with the bottom opening of the latter in register with the mouth of said passage, a receptacle located laterally with respect to said pedestal, a conduit leading from said tank to said receptacle and having communication with said passage, said conduit affording means to flow molten glass to said receptacle and to said passage, in each of which such glass rises to the level of the glass in said tank, means to cool the surface of the glass in said receptacle to a condition of high viscosity in which it constitutes an elastic diaphragm overlying glass of relatively low viscosity, additional controllable means associated with said receptacle and with said pedestal for maintaining the glass at different temperatures in different parts, and a plunger disposed within said receptacle and adapted for actuation, with said diaphragm serving as a packing therefor, to produce displacement of glass whereby the column of glass in said passage is elevated for depositing a charge thereof within said mold.

15. The combination with a glass-melting tank and a ware-shaping mold, the latter having a glass-introducing opening in its bottom, of apparatus for effecting the transfer of glass from said tank to said mold, said apparatus comprising a pedestal having its top located above the level of the glass in said tank and having a passage for glass leading upward therethrough, said pedestal being adapted for receiving said mold thereon with the bottom opening of the latter in register with the mouth of said passage, a receptacle located laterally with respect to said pedestal, a conduit leading from said tank to said receptacle and having communication with said passage, said conduit affording means to flow molten glass to said receptacle and to said passage, in each of which such glass rises to the level of the glass in said tank, means to cool the surface of the glass in said receptacle to a condition of high viscosity in which it constitutes an elastic diaphragm overlying glass of relatively low viscosity, and a plunger cushioned on said diaphragm and adapted to be depressed for displacing glass in said receptacle and in said passage whereby the column of glass in the latter is elevated to a point at which a charge thereof is received within said mold, means for maintaining the fluidity of the glass during its flow from the tank to said receptacle and to said well, and means for cooling the upper end of said column to working consistency prior to the introduction of charges in the mold.

In testimony whereof, I affix my signature in presence of two subscribing witnesses.

RICHARD T. McGEE.

Witnesses:
FRANCES J. DUNLAP,
H. E. DUNLAP.